Dec. 27, 1960
R. W. HEINZEN
2,966,324
SUPPORTING BRACKET
Filed Oct. 4, 1955
2 Sheets-Sheet 1
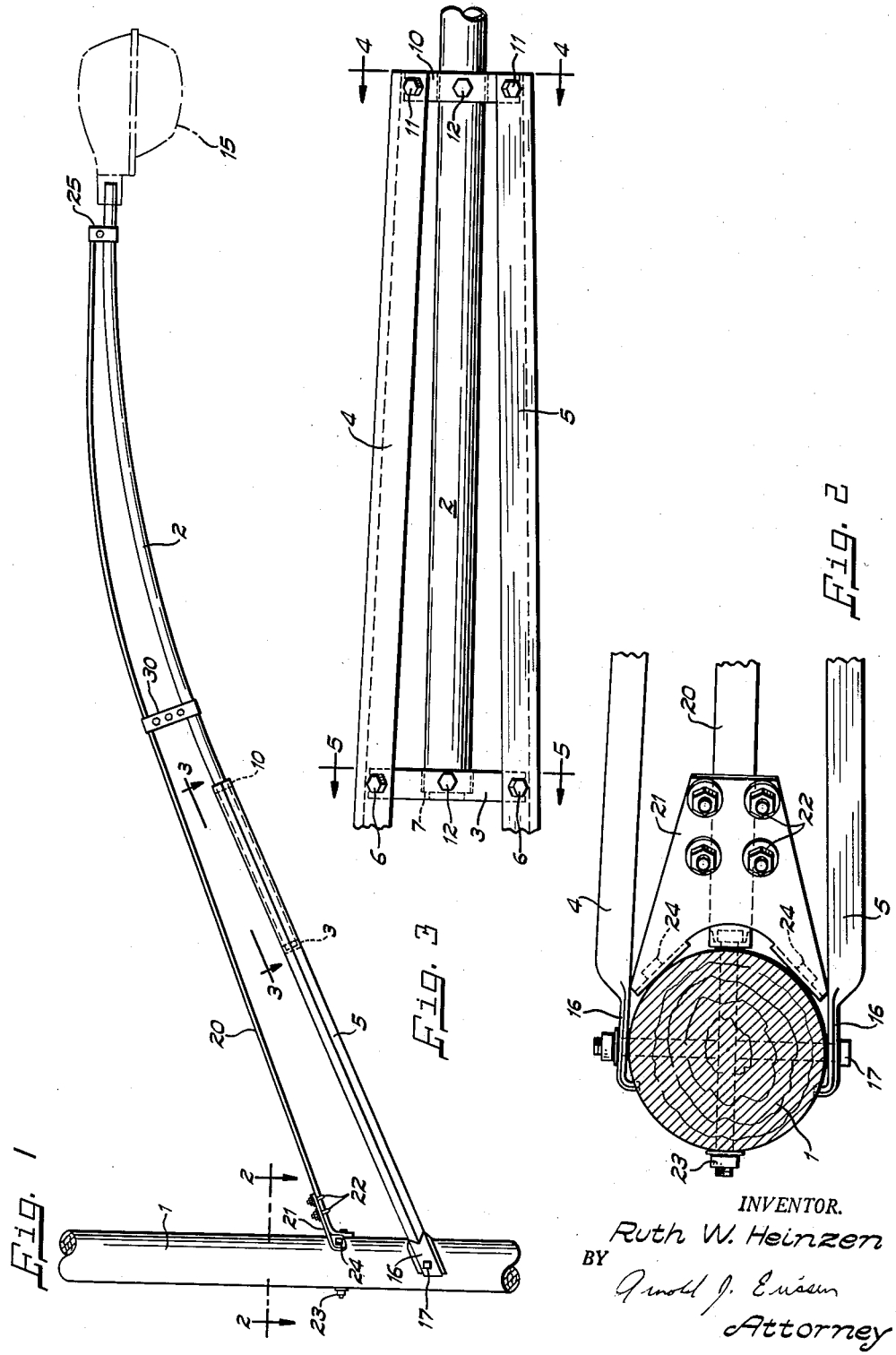
INVENTOR.
Ruth W. Heinzen
BY
Arnold J. Ericson
Attorney Dec. 27, 1960   R. W. HEINZEN   2,966,324
SUPPORTING BRACKET Filed Oct. 4, 1955   2 Sheets-Sheet 2

INVENTOR.
Ruth W. Heinzen
BY
Arnold J. Ericsen
Attorney

United States Patent Office 2,966,324
Patented Dec. 27, 1960

2,966,324
SUPPORTING BRACKET

Ruth W. Heinzen, Milwaukee, Wis., assignor to McGraw-Edison Company, a corporation of Delaware Filed Oct. 4, 1955, Ser. No. 538,423

2 Claims. (Cl. 248—221)

The present invention relates to a supporting bracket, and particularly relates to a bracket adapted to support a pendant load, such as a street light or highway luminaire from the terminal end thereof.

Recent developments in the field of street lighting have provided improved support brackets of relatively extended length, especially for use in installations adjacent roadways which extend past urban areas. In addition, where street light poles are positioned on boulevard dividing strips, and where spreading trees may obscure projected illumination, the brackets must also be of extended length. Obviously, this extended length subjects the bracket and the pole to considerable stress and strain, even under normal weather conditions.

With the use of larger and heavier street light luminaires, wind loading has become a decided factor in strength requirements for brackets and poles. In the past, luminaires were small and their supports were short. But today, increased demands for quality lighting requiring larger luminaires have resulted in the need for greater appreciation of wind loading.

In order to provide properly designed supports, two very important factors must be considered. These are pole space used, and strength requirements relating to both lateral and vertical loading. Naturally, both of these factors must be weighed and results accomplished with an aesthetically pleasing support. In addition, poles and other upright support members are often used for multiple purposes, such as supporting primary and distribution lighting and other electrical circuits, in addition to carrying telephone and telegraph lines with multi-circuit installations. A very recent and important improvement in the field of supporting brackets has been provided in the copending application, Serial No. 528,394, filed on August 15, 1955, now Patent Number 2,907,543, by the present inventor, and assigned to the same assignee as is the present invention. The bracket disclosed in the copending application included a tension member guy rod, or the like, attached at one end to a compression member, which was preferably of the upsweep type. Intermediate the attachment point of the two members and the vertical support member, such as a pole or street light standard, there was positioned a strut or brace member of particular design and location relative to the other members. The strut permitted a minimum of pole space with a maximum of vertical loading, and also compensated for the tendency of the bracket to rotate about the point of attachment when this point was spaced inwardly of the extremity of the upsweep compression member.

The present invention also includes the aforesaid strut or brace member, and further includes a tension member in the form of an elongated channelled truss or tension member. The improved design provides additional lateral strength and improved rigidity, especially in a relatively longer length bracket assembly.

In addition to the above, it is an object to provide an improved supporting bracket with particularly designed fittings for joining the various elements together and with the vertical support to provide an improved bracket of increased length and rigidity for withstanding wind loading on comparatively larger luminaires suspended at a comparatively extended lateral distance than conventional bracket assemblies.

Referring now to the drawings:

Fig. 1 is a side elevation view of a supporting bracket constructed in accordance with the present invention, and shown mounted on a pole with a street light luminaire being mounted on the terminal end and illustrated by dot-dash lines.

Fig. 2 is a fragmentary top plan view of a portion of the bracket of Fig. 1 showing the vertical support member in cross-section and taken along lines 2—2 of Fig. 1.

Fig. 3 is also a fragmentary top plan view of a portion of the bracket of Fig. 1 taken along lines 3—3 of Fig. 1.

Figure 4:
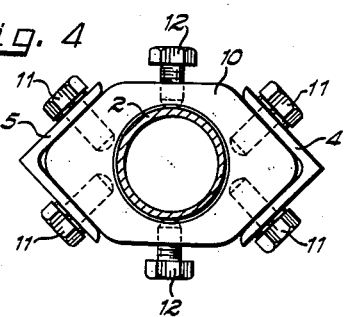
Fig. 4 is an end view, partly in section, taken along lines 4—4 of Fig. 3.

A preferred embodiment of the supporting bracket is illustrated in the drawings, wherein the bracket assembly is shown mounted on an upright wood pole or standard 1. It will be obvious, however, that the assembly may be mounted on any conventional upright, including the vertical wall of a building (not shown). The preferred assembly comprises a structure conventionally known as an "A-frame" assembly, and preferably includes an upsweep tubular mast arm 2 terminating at one end in a transverse fitting 3, specifically shown in Fig. 5. The transverse fitting 3 is bevelled to converge at its ends for receiving L-shaped channelled angle braces 4 and 5, which are fastened in place by means of threaded bolts 6.

Figure 5:
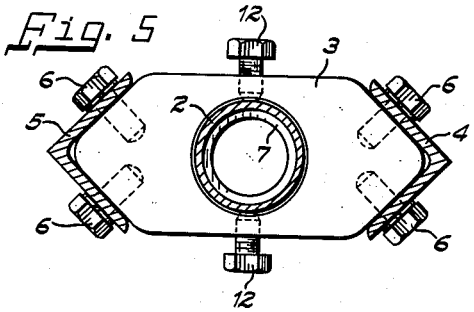
Fig. 5 is a cross-sectional view taken along lines 5—5 of Fig. 3.
Figure 6:
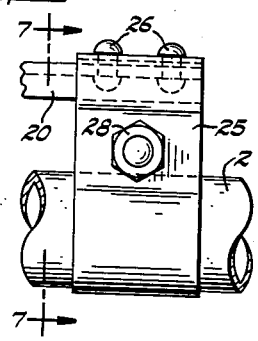
Fig. 6 is a fragmentary elevational view illustrating the means of joining the tension and compression members.

The fitting 3 is also provided with a shouldered portion 7 at the pole side thereof to provide a stop means for preventing axial movement of the mast arm 2 (see Fig. 5).

The mast arm 2 is also preferably graspingly engaged by means of a transverse fitting 10 intermediate its ends, which fitting is similar in configuration to the fitting 3 and is arranged to be fastened to the outer extremities of the braces 4 and 5 by means of the bolts 11. Both the fittings 3 and 10 are positioned in place relative to the mast arm by means of set screws 12 engaging the arm at its periphery.

The free end of the mast arm 2 is arranged to receive the slip fitter portion of a luminaire 15. The luminaire is shown here in dotted lines, and may be of any of a vast multitude of varieties provided by several manufacturers. It is also conventional to provide the mast arms of tubular material of one of two conventional diameters; i.e., 1¼" and 2". The channelled angle braces 4 and 5 diverge relative to one another in a direction towards the pole 1, to provide an "A-frame" construction, and are preferably flattened at the pole end to provide the pole engaging surface 16 which is apertured to receive a thru bolt and nut assembly 17 transversely of the pole 1. In addition, the flattened portion 16 of each brace is bent inwardly at the end thereof to engage the periphery at diametrically opposite sides of the pole to provide added rigidity to the structure.

It will be noted that the A-frame construction provides a rigid structure which is adaptable for withstanding considerable lateral loading caused by high wind forces exerted against the relatively large modern luminaires.

The present invention also contemplates the provision of an improved tension member in the form of a generally U-shaped elongated channel member 20. The member 20 may be attached to the pole by means of a pole plate 21, which may be either welded to the channel or fastened in place by means of the U-bolt and nut assemblies 22. The channelled tension member is preferably bent downwardly at the end for additional support and is fastened to the pole by means of a thru bolt and nut assembly 23. The pole plate 21 is fastened to the pole by means of spaced lag screws 24.

It will be apparent that to make the tension member 20 in the form of a U-shaped channel provides a relatively inexpensive structure providing additional rigidity to the relatively long supporting bracket. In the past, tension members have usually been provided from braided or twisted cable or guy rods having circular cross sections. These have been very successful in use with brackets of relatively small lengths, but in brackets of increased length upwardly of 20 ft., it has been found that additional rigidity is needed along the entire length of the bracket to withstand lateral forces exerted thereon. The U-shaped channel material is easily obtained on the market, and offers excellent strength characteristics in both axial and lateral directions.

The attachment fittings disclosed in Figs. 6 through 9 are particularly adaptable for use in the present structure, in that they permit the compression and tension members to be joined in an adjustable manner. That is, the members are joined principally by means of straps embracingly engaging the members and releasable for adjustment of the respective members due to manufacturing variations, displacement during transit, and other minor deviations that are apt to be amplified in supports of relatively extended length.

Figure 7:
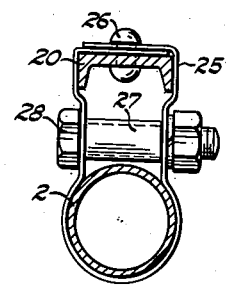
Fig. 7 is a cross-sectional view taken at lines 7—7 of Fig. 6.

The tension member 20 and the mast arm 2 are preferably joined together at their terminal ends by means of a sheet metal strap 25, which is formed to provide a circular cross section at the bail of a reverse curve thereof to conform with the external diameter of the mast arm 2. The free ends are then bent inwardly opposite one another at approximately right angles to conform to the upper surface of the channel member 20. The free ends of the strap 25 are preferably overlapped as shown in Fig. 7 to provide additional surface engagement and a relatively strengthened cross section for receiving a conventional rivet 26 positioned to hold the members relative to one another.

After the members 2 and 20 have been positioned relative to one another, a spacer sleeve 27 is inserted between the leg portions of the strap 25, and a bolt and nut assembly 28 is positioned in apertures in the strap communicating with the sleeve 27. Thus, when the bolt and nut assembly 28 is tightened in place, there will be a tendency for the strap to be wrapped tightly in place relative to the mast arm 2.

As stated above, the brace or strut member 30 (shown in Figs. 8 and 9) has been thoroughly discussed and claimed in the copending application, Serial No. 528,394. The supporting bracket disclosed in the present application conforms in every manner to the bracket disclosed in the copending application and further includes an improved embodiment of the strut for particular adaptation to the assembly herein disclosed.

As was outlined in the copending application, there are two major factors that must be considered in the design of laterally extending supporting brackets. First, especially in the case of mast arms having a curvature, the mast arm is placed in compression when a load is positioned on the terminal end which tends to cause the arm to buckle at some point along the curvature. The second factor that must be considered is that the mast arm portion of a bracket assembly generally extends as much as 18 inches beyond the attachment point of the mast arm with the guy rod, or tension member. It will be apparent that a load dependent from the extended terminus of the mast arm will set up a rotative moment or couple, tending to cause the mast arm to rotate about the point of attachment with the tension member. Proper placement and design of the supporting brace or strut will compensate for both of these factors, and in addition, provide an assembly which utilizes a minimum of pole space. The design and construction of the spacer strut has been fully disclosed and claimed in the copending application.

The strut or brace 30 of the present invention is preferably in the form of a sheet metal strap joining both the tension member 20 and the mast arm 2. The strap is formed to conform to the diameter of the mast arm 2 and includes the further formation of the free ends to overlap on one another and conform to the outer surface of the channel member 20. The strap is riveted in place by means of the rivets 31. For additional support and to insure padded grasping engagement with the mast arm and the tension member 20, a series of spaced apart bolt and nut assemblies 32 are positioned transversely relative to the strap and apertures communicating with one another. After the mast arm is inserted in the strap, the bolts 32 are tightened to provide a secure supporting strut and to graspingly engage the mast arm and tension member in accordance with the teachings of the copending application.

Figure 10:
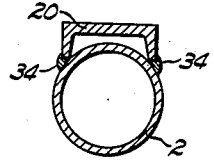
Fig. 10 is a cross-section similar to Fig. 7 of another embodiment illustrating a variation in means for fastening the guy member to the mast arm.
Figure 8:
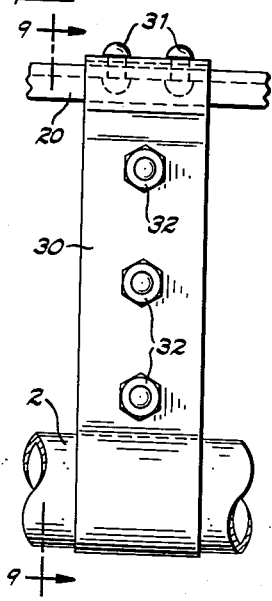
Fig. 8 is a fragmentary elevational view illustrating the preferred strut or brace member positioned between the tension member and the compression members.
Figure 9:
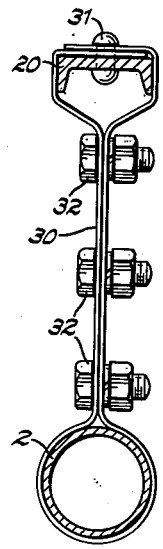
Fig. 9 is a cross-sectional view taken along lines 9—9 of Fig. 8.

The embodiment of Fig. 10 illustrates another form of attaching the compression member to the tension or guy member, and includes a weldment 34 along the junction of the tubular mast arm 2 and the channel member 20. It will be noted that the construction provides a compact assembly with the channel member straddling the outer surface of the tube to provide a relatively rigid and strong construction.

It will be apparent that the present invention has provided an improved supporting bracket for supporting vertical pendant loads, wherein said bracket provided an improved tension member in the form of a channelled elongated brace cooperating with a strap member for supporting a mast arm under compression, and which may be adapted to a basic A-frame construction if so desired, or which tension member may be attached to a mast arm extending directly from a vertical support.

I claim:

1. In combination, an upright member, an elongated, upsweep-type, luminaire-supporting mast arm extending laterally from said upright member and having the end nearer said upright member spaced laterally from said upright member, a pair of elongated braces rigidly engaging said mast arm at at least two longitudinally spaced points on said mast arm and diverging relative to one another in a direction away from said mast arm and arranged for engagement with opposite sides of said upright member, whereby said braces extend longitudinally of a portion of said mast arm and reinforce said mast arm against lateral loads, the other end of said mast arm being raised above said nearer end and adapted to support a load in spaced relation from said upright member, an elongated guy member vertically spaced above said mast arm and said braces and attached at one end to said mast arm at a point spaced from said other end in a direction towards said upright member, and means for attaching the other end of said guy member to said upright member and for holding said other end against rotation about the longitudinal axis of said guy member.

2. In combination, an upright member, an elongated, upsweep-type, luminaire-supporting mast arm extending laterally from said upright member and having a curvilinear portion subject to buckling forces, said mast arm having the end further removed from said upright member raised above the end nearer said upright member and having the end nearer said upright member spaced laterally from said upright member, a pair of elongated braces extending longitudinally of said mast arm adjacent said nearer end thereof and being rigidly affixed to said nearer end at at least two longitudinally spaced points on said mast arm, said braces diverging relative to one another in a direction away from said mast arm and arranged for engagement with opposite sides of said upright member, said further removed end of said mast arm being adapted to support a load in spaced relation from said upright member, an elongated guy member of U-shaped cross section vertically spaced above said mast arm and said braces and attached at one end to said mast arm at a point spaced from said further removed end in a direction toward said upright member, means for attaching the other end of said U-shaped cross section guy member to said upright member and for holding said other end against rotation about the longitudinal axis of said guy member, and strut means attached to said curvilinear portion of said mast arm intermediate the ends thereof and extending transversely from said mast arm and engaging said guy member for counteracting the forces tending to buckle said curvilinear portion of said mast arm, said strut means being under compression when said load is applied to said further removed end of said mast arm.

References Cited in the file of this patent

UNITED STATES PATENTS

| | | |
|---|---|---|
| 636,327 | Fletcher | Nov. 7, 1899 |
| 738,163 | Clutter | Sept. 8, 1903 |
| 1,725,475 | Peterson | Aug. 20, 1929 |
| 1,760,323 | Shelton | May 27, 1930 |
| 1,866,530 | Funk | July 12, 1932 |
| 2,608,369 | Hocher | Aug. 26, 1952 |
| 2,653,782 | Pfaff | Sept. 29, 1953 |
| 2,696,357 | Elmer | Dec. 7, 1954 |
| 2,731,227 | Anderson | Jan. 17, 1956 |